March 17, 1925.

E. D. CHURCH

GEAR WHEEL SILENCER

Filed Feb. 21, 1924

1,530,072

Edgar D. Church.
Inventor

By Geo. B. Willis
Attorney

Patented Mar. 17, 1925.

1,530,072

UNITED STATES PATENT OFFICE.

EDGAR D. CHURCH, OF SAGINAW, MICHIGAN, ASSIGNOR TO JACKSON & CHURCH CO., OF SAGINAW, MICHIGAN, A CORPORATION OF MICHIGAN.

GEAR-WHEEL SILENCER.

Application filed February 21, 1924. Serial No. 694,267.

*To all whom it may concern:*

Be it known that I, EDGAR D. CHURCH, a citizen of the United States, residing at Saginaw, in the county of Saginaw and State of Michigan, have invented certain new and useful Improvements in Gear-Wheel Silencers; and I do hereby declare the following to be a full, clear, and exact description of the invention, such as will enable others skilled in the art to which it appertains to make and use the same.

This invention is a device for absorbing the sonorous vibrations and overcoming the resonance of revolving gear wheels and the like.

The resonant vibration of gear wheels, especially those of large diameter having relatively long rim sections between the spokes and having long spokes, has been a source of annoyance. The roaring noises produced by such gears are caused primarily by the transverse vibrations of the spokes and of the parts of the rim between the spokes.

The object of my invention is to provide a sound-deadening device that is simple in construction and adapted to be readily applied to existing gears.

With the foregoing and certain other objects in view which will appear later in the specifications, my invention comprises the devices described and claimed and the equivalents thereof.

In the drawings Fig. 1 is a side view, partly broken away, showing a gear to which my improvement is applied.

Figure 1:
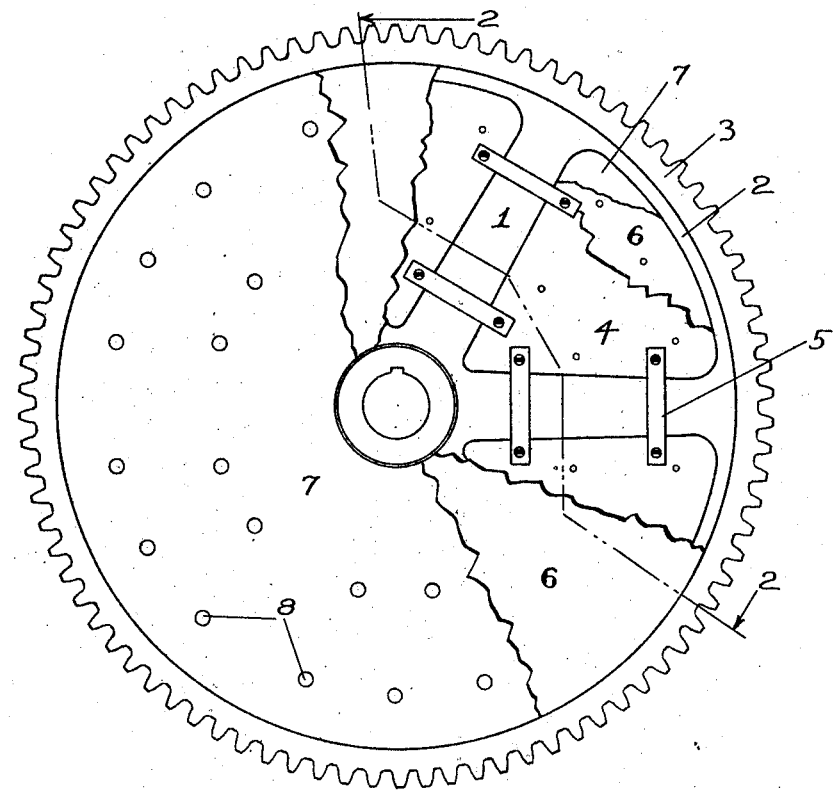
Figure 2:
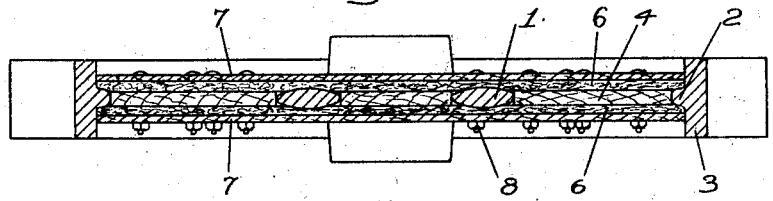
Fig. 2 is a section on line 2—2 of Fig. 1.
Figure 3:
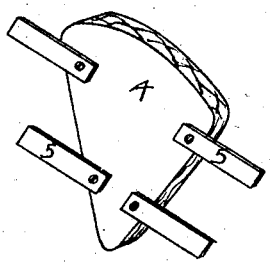
Fig. 3 is a perspective view of the board filler.

As is clearly shown in the drawings 1 indicates the spokes of a gear wheel and 2 is the internal rib of rim 3.

To avoid transverse vibrations and consequent roaring of the gear I insert in the segmental space between the spokes and rim a filler 4 preferably built up of boards equal in thickness to the thickness of the spokes. This segmental filler element is formed to a close fit between the edges of the spokes and the inner edge of rib 2. Fastening devices 5 such as straps or bands are employed for securing the filler elements in position on the spokes.

Outside the filler elements and the spokes is a layer 6 of non-sonorous material such as builders' tar felt, covering the filler elements 4 and the sides of the spokes. Outside these layers of non-sonorous material is a disk cover 7. The segmental filler elements 4, the non-sonorous layer 6 and the disk cover 7 are fastened together and clamped upon the spokes and rim by any suitable fastening means such as bolts 8.

In practice I prefer to provide two layers of felt and two disk covers, one on each side of the filler element 4, but it is not always necessary to employ more than one layer of non-sonorous material and one disk cover in order to satisfactorily overcome the resonance of the gear.

The construction and arrangement herein described effectually prevents sidewise or in and out vibration of the rim and sympathetic vibrations of the spokes, because the segmental filler element, having its edges tight against the edges of the spokes and the rib of the rim, completely does away with such vibrations.

Lateral or drum head vibrations are deadened by the elastic or non-sonorous layers of felt or fibrous material that overlie the sides of the spokes and of the segmental fillers.

The disk covers, when bolted together tightly clamp all the parts and form a smooth exterior surface for the gear, presenting a neat appearance and decreasing accident hazards, as well as converting a violent noise-producing gear into a condition in which it operates almost noiselessly.

While I have shown and described my improvement as applied to gear wheels having spokes, it may also be used with gears having flat disks instead of spokes, the disks being provided with lightening holes, or without, as the case may be.

In a disk wheel the segmental filler member 4 is not employed because the space is filled by the metal of the disk and consequently lateral vibrations of the rim are thereby prevented. These same vibrations, however, increase the tendency in disk wheels to give out drum head vibrations and on such wheels I employ, as has been described herein, the non-sonorous layers 6 and the disk covers 7, securing them by means of the bolts 8, or an equivalent fastening.

Having thus described my invention, what I claim and desire to secure by Letters Patent is:

1. In a spoked gear wheel, a plurality of segmental filler elements each having its edges in close contact with the edges of the spokes and with the rim, fastening devices securing said filler elements to the spokes, a layer of non-sonorous material covering said elements and the sides of the spokes, a disk cover upon said layer, and fastening means for securing said segmental elements, non-sonorous layer and cover together upon said spokes.

2. In a spoked gear wheel, a plurality of segmental filler elements each having its edges in close contact with the edges of the spokes and with the rim, a layer of non-sonorous material covering each side of said elements and the sides of the spokes, a disk cover upon each of said layers, and bolts securing said segmental elements, non-sonorous layers and covers together upon said spokes and rim.

3. In a spoked gear wheel, a layer of non-sonorous material covering each side of said wheel and the sides of the spokes between the hub and rim, a disk cover upon each of said layers, and bolts securing said non-sonorous layers and covers together upon said spokes and rim.

In testimony whereof I affix my signature.

EDGAR D. CHURCH.